(12) United States Patent
Lin et al.

(10) Patent No.: US 10,085,011 B2
(45) Date of Patent: Sep. 25, 2018

(54) IMAGE CALIBRATING, STITCHING AND DEPTH REBUILDING METHOD OF A PANORAMIC FISH-EYE CAMERA AND A SYSTEM THEREOF

(71) Applicant: Toppano Co., Ltd., Taipei (TW)

(72) Inventors: Tzong-Li Lin, Taipei (TW);
Hong-Shiang Lin, Taipei (TW);
Chao-Chin Chang, Taipei (TW)

(73) Assignee: HANGZHOU YUTU TECHNOLOGY CO., LTD., Hangzhou, Zhejiang (CN)

( * ) Notice: Subject to any disclaimer, the term of this patent is extended or adjusted under 35 U.S.C. 154(b) by 93 days.

(21) Appl. No.: 15/332,204

(22) Filed: Oct. 24, 2016

(65) Prior Publication Data
US 2017/0134713 A1 May 11, 2017

(30) Foreign Application Priority Data

Nov. 6, 2015 (TW) ............................. 104136624 A

(51) Int. Cl.
*G03H 1/04* (2006.01)
*H04N 13/246* (2018.01)
(Continued)

(52) U.S. Cl.
CPC ......... *H04N 13/246* (2018.05); *G06T 3/0018* (2013.01); *G06T 7/002* (2013.01);
(Continued)

(58) Field of Classification Search
CPC ........... H04N 13/0246; H04N 13/0007; H04N 5/247; H04N 13/0282; H04N 13/026; H04N 5/374; H04N 13/0242; H04N 5/23238; H04N 2213/003; G06T 7/002; G06T 3/0018; G06N 3/08
See application file for complete search history.

(56) References Cited

U.S. PATENT DOCUMENTS

| 6,486,877 B1 * | 11/2002 | Watanabe | G06T 17/10 345/420 |
| 2005/0122400 A1 * | 6/2005 | Kochi | H04N 5/217 348/207.99 |

(Continued)

*Primary Examiner* — Tat C Chio

(57) ABSTRACT

The present invention provides an image calibrating method of a panoramic fish-eye camera comprising the following steps of: establishing a panoramic optical target space; using the panoramic fish-eye camera for shooting the panoramic optical target space's panoramic image; establishing a depth calibration parameter by using a depth calibration module; establishing an internal calibration parameter of the panoramic fish-eye camera; establishing an image stitching parameter and a space depth transformation parameter of the panoramic image and the panoramic optical target space; and using the internal calibration parameter, the image stitching parameter, the space depth transformation parameter and the depth calibration parameter to calibrate the panoramic image for generating a 3D panoramic image. Compared to the prior art, the present invention can optimize the calibration parameters by accumulating all the camera parameters and executing a machine learning for increasing the computing efficiency.

5 Claims, 4 Drawing Sheets

(51) Int. Cl.
*H04N 13/106* (2018.01)
*H04N 13/243* (2018.01)
*H04N 13/261* (2018.01)
*H04N 13/282* (2018.01)
*G06T 3/00* (2006.01)
*G06T 7/00* (2017.01)
*H04N 5/232* (2006.01)
*H04N 5/247* (2006.01)
*H04N 5/374* (2011.01)
*H04N 17/00* (2006.01)
*G06N 3/08* (2006.01)

(52) U.S. Cl.
CPC ......... *H04N 5/23238* (2013.01); *H04N 5/247* (2013.01); *H04N 5/374* (2013.01); *H04N 13/106* (2018.05); *H04N 13/243* (2018.05); *H04N 13/261* (2018.05); *H04N 13/282* (2018.05); *H04N 17/002* (2013.01); *G06N 3/08* (2013.01); *H04N 2213/003* (2013.01)

(56) References Cited

U.S. PATENT DOCUMENTS

| | | | | |
|---|---|---|---|---|
| 2010/0141733 A1* | 6/2010 | Borchers | ............... | H04N 5/2259 348/36 |
| 2010/0245539 A1* | 9/2010 | Lin | ...................... | H04N 5/2258 348/36 |
| 2016/0379415 A1* | 12/2016 | Espeset | ................... | G06T 15/04 345/633 |
| 2016/0381306 A1* | 12/2016 | Yang | ......................... | G06T 3/40 386/280 |

\* cited by examiner

IMAGE CALIBRATING, STITCHING AND DEPTH REBUILDING METHOD OF A PANORAMIC FISH-EYE CAMERA AND A SYSTEM THEREOF

BACKGROUND OF THE INVENTION

1. Field of the Invention

The present invention relates to an image calibrating, stitching and depth rebuilding method of a panoramic fish-eye camera and a system thereof, more particularly, to the image calibrating, stitching and depth rebuilding method of a panoramic fish-eye camera and a system thereof utilized for calibrating a panoramic image by means of an image stitching parameter (i.e. external calibration parameter) and a space depth transformation parameter acquired from a panoramic optical target space shot by a panoramic fish-eye camera, a depth calibration module for acquiring actual depth data between the camera and the target, and an internal calibration parameter of the panoramic fish-eye camera.

2. Description of the Prior Art

When the cameras are created in the world, people begin to record their daily life or important events in history by means of images. As to the technique and equipment of photography, low definition black and white pictures have been developed to high definition color pictures and to the high speed cameras which can shoot two billion frames per second in advance. Additionally, as to the visual effect of photography, not only the planar images but also the 3D images can be shot.

In the prior art, the 3D images are shot by utilizing a twin-lens camera of a 3D camera. But the 3D images can be shot within some angles of the view which are limited by the photographic scopes of the equipment, or the 360-degree surrounding panoramic images are shot by a photographer who holds a camera and turns around. However, the photographer must spend much time for shooting the panoramic images by utilizing this method. Therefore, a method for shooting a 3D panoramic image by utilizing several 3D cameras at the same time is provided The configurations of three cameras to tens of cameras are existed now, but they all belong to the monocular vision system. And the depth information cannot be computed or acquired by utilizing parallax because of the photographic scopes overlapping of the camera. And the depth information is required for the 3D information of the virtual reality and the augmented reality. Consequently, how to get the 3D depth information by using the cameras is very important.

In order to solve the aforementioned problem, an image calibrating, stitching and depth rebuilding method of a panoramic fish-eye camera and a system thereof are provided. A panoramic image stitching parameter (external calibration parameter) is computed by means of finding out an internal calibration parameter between the semi-spherical shaped fish-eye lens and the planar CMOS sensor modules of the panoramic fish-eye camera and a panoramic optical target space shot by the panoramic fish-eye camera, and by means of building a space depth transformation parameter between a 2D planar image and an object depth in 3D space at the same time. Finally, the internal calibration parameter, the panoramic image stitching parameter (external calibration parameter) and the space depth transformation parameter are utilized to calibrate a panoramic image shot by the panoramic fish-eye camera for generating a 3D panoramic image.

However, another problem is generated in the aforementioned image calibrating, stitching and depth rebuilding method of a panoramic fish-eye camera and a system thereof. It is a heavy computing load for the computing hardware to compute the depth in the panoramic images of all targets in the panoramic optical target space shot by the panoramic fish-eye camera when a space depth transformation parameter is established. In addition, when the real images are shot, if one object of real scenes does not have any characteristic which can be recognized by the computer vision, the actual depth of the object will not be computed.

Therefore, the actual depth of some targets in the panoramic optical target space shall be acquired by the panoramic fish-eye camera first, and then the actual depth of some targets is utilized as a reference datum for computing the depth of other targets in the panoramic optical target space, so as to reduce the computing load of the computing hardware. And it becomes a new issue to be resolved.

SUMMARY OF THE INVENTION

Therefore, in order to solve the aforementioned problem, the present invention provides an image calibrating, stitching and depth rebuilding method of a panoramic fish-eye camera. The method is utilized for calibrating a panoramic image shot by a panoramic fish-eye camera for generating a 3D panoramic image which comprises object depth information. The panoramic fish-eye camera comprises four fish-eye lens, four CMOS sensor modules and a depth calibration module, wherein each one of the fish-eye lens can be attached with a CMOS sensor module. The method provided by the present invention comprises the following steps:

establishing a panoramic optical target space, wherein the panoramic optical target space comprises a depth calibration target; utilizing the panoramic fish-eye camera for shooting the panoramic image of the panoramic optical target space; establishing a depth calibration parameter between the depth calibration module and the depth calibration target; establishing an internal calibration parameter of the panoramic fish-eye camera; establishing an image stitching parameter (external calibration parameter) of the panoramic image and the panoramic optical target space; establishing a space depth transformation parameter of the panoramic image and the panoramic optical target space; and utilizing the image stitching parameter, the space depth transformation parameter, the depth calibration parameter and the internal calibration parameter to generate a 3D panoramic image, which comprises the panoramic depth information.

Furthermore, the space depth transformation parameter is a transformation parameter between a 2D planar image and an object depth in 3D space; the internal calibration parameter is the coordinate transformation parameter between the fish-eye lens and the CMOS sensor modules of the panoramic fish-eye camera; the image stitching parameter (external calibration parameter) is used for a panoramic image stitching parameter by means of computing the relationships between the physical body and the space coordinate of the four fish-eye lens from the images shot by the panoramic fish-eye camera; and the depth calibration parameter is an actual distance (or actual depth) between the depth calibration module of the panoramic fish-eye camera or some targets in the panoramic optical target space, wherein the depth calibration parameter can be utilized as a depth calibration reference datum of the space depth transformation parameter.

The method provided by the present invention further comprises the following step: optimizing the parameters. The optimized parameters can be acquired by means of collecting the depth calibration parameter from the panoramic fish-eye cameras respectively and accumulating a parameter data, and by means of a machine learning method for optimizing the parameters.

The present invention provides an image calibrating, stitching and depth rebuilding system of a panoramic fish-eye camera for generating a panoramic image and panoramic depth information, and the panoramic image and panoramic depth information are calibrated to generate a 3D panoramic image. The system provided by the present invention comprises a panoramic fish-eye camera, a module for generating panoramic image and panoramic depth information and a computing module. The computing module can be a cloud computing module or be comprised in the cameras.

The panoramic fish-eye camera comprises four fish-eye lens, four CMOS sensor modules and a depth calibration module, wherein each one of the fish-eye lens can be attached with a CMOS sensor module. The intersection angle of the shooting directions of the neighboring fish-eye lens is 90 degrees. The module for generating panoramic image and panoramic depth information is electrically connected with the panoramic fish-eye lens module, comprising an internal calibration parameter, an image stitching module, a space depth transformation parameter module and a depth calibration module.

An internal calibration parameter is stored in the internal parameter calibration module, utilized for providing the required parameters of the coordinate transformation between the fish-eye lens and the CMOS sensor modules. An image stitching parameter is stored in the image stitching module, utilized for stitching the panoramic images shot by the panoramic fish-eye camera to a panoramic picture. A space depth transformation parameter is stored in the space depth transformation parameter module, utilized for providing a transformation parameter between a 2D planar image and an object depth in 3D space to the panoramic fish-eye camera, to get the panoramic depth information of each pixel in the panoramic images. A depth calibration parameter is stored in the depth calibration module, utilized as a depth calibration reference datum of the space depth transformation parameter. The computing module is electrically connected with the module for generating the panoramic image and the panoramic depth information, utilized for calibrating and stitching the panoramic picture and the panoramic depth information to generate the 3D panoramic image.

The system provided by the present invention further comprises an optimization module. The optimization module is electrically connected with the module for generating the panoramic image and panoramic depth information. The optimization module can accumulate a parameter data by means of collecting the depth calibration parameter from each of the panoramic fish-eye cameras, and then optimize the parameter data by a machine learning method.

Compared to the prior art, the panoramic images and depth information can be acquired quickly by the present invention, and each of the parameters can be optimized by means of a machine learning method to accumulate data, so as to simplify the algorithm of 3D depth and to enhance the computing efficiency. Furthermore, the simplified algorithm of 3D depth can be implanted to be executed on a single-chip, so the image calibration system of the panoramic fish-eye camera can be calibrated instantly and portable conveniently.

BRIEF DESCRIPTION OF THE APPENDED DRAWINGS

DETAILED DESCRIPTION OF THE INVENTION

In order to allow the advantages, spirit and features of the present invention to be more easily and clearly understood, the embodiments and appended drawings thereof are discussed in the following. However, the present invention is not limited to the embodiments and appended drawings.

Figure 1:
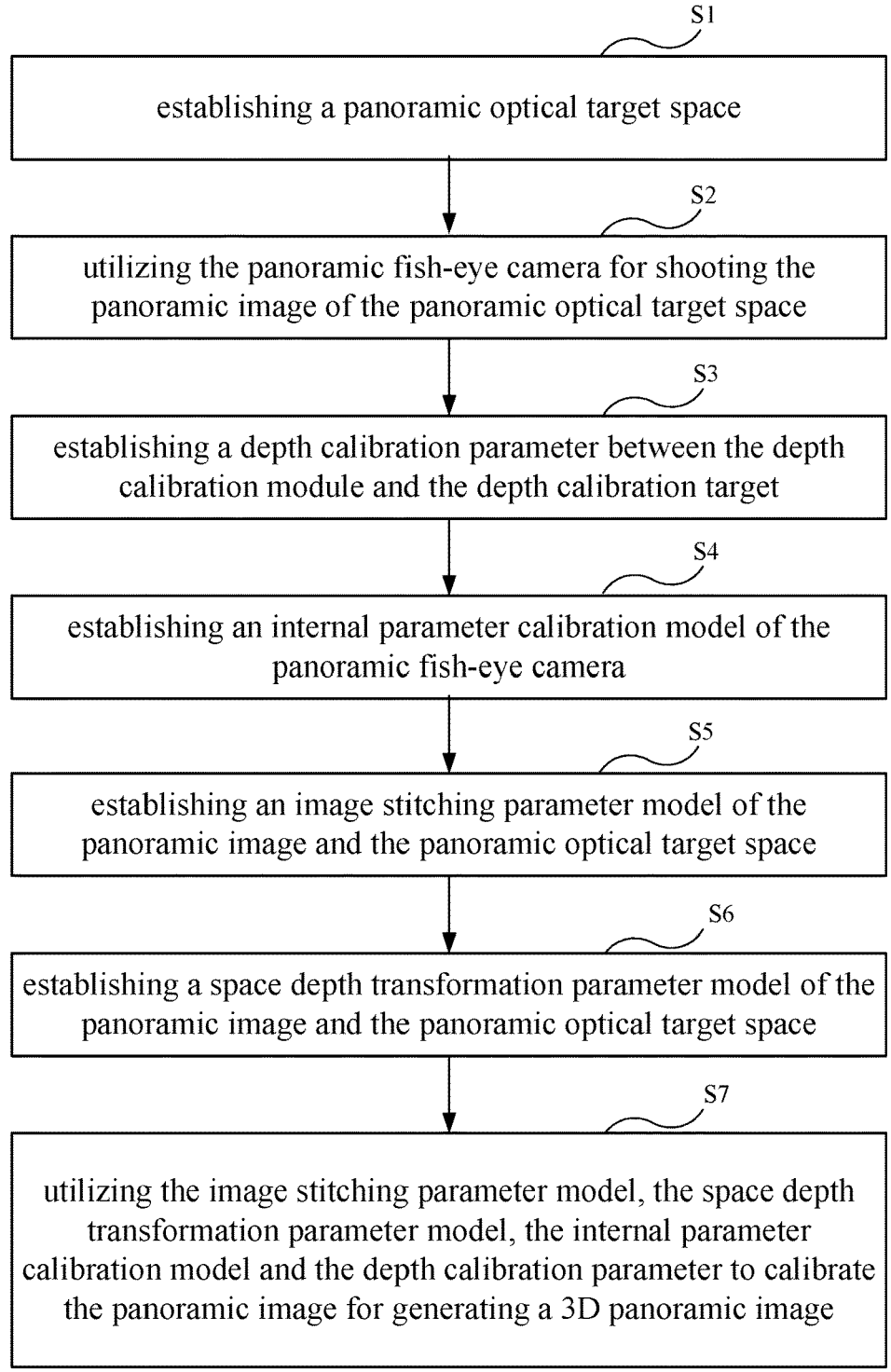
FIG. 1 is a method flowchart according to one embodiment of the present invention.
Figure 2:
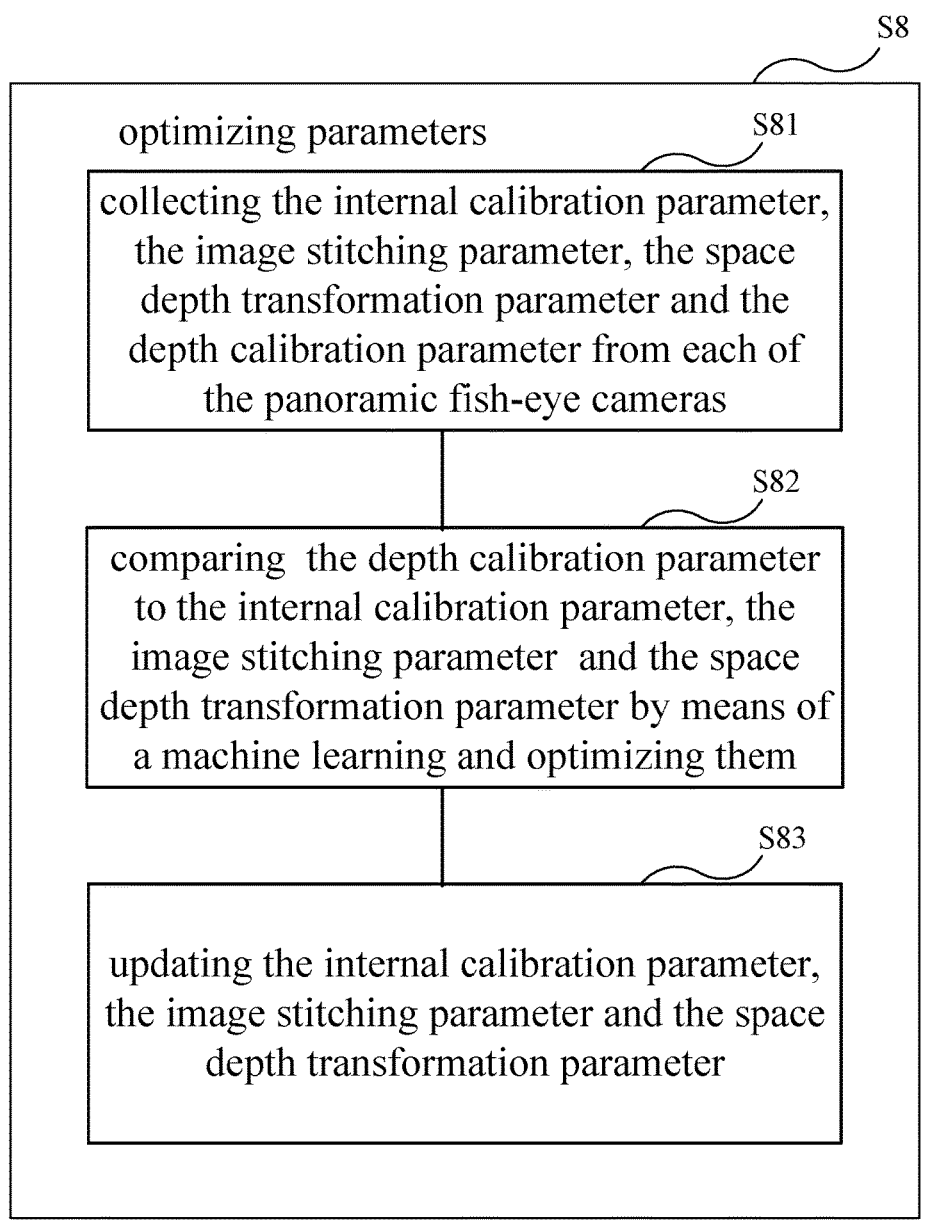
FIG. 2 is a method flowchart according to one embodiment of the present invention.
Figure 3:
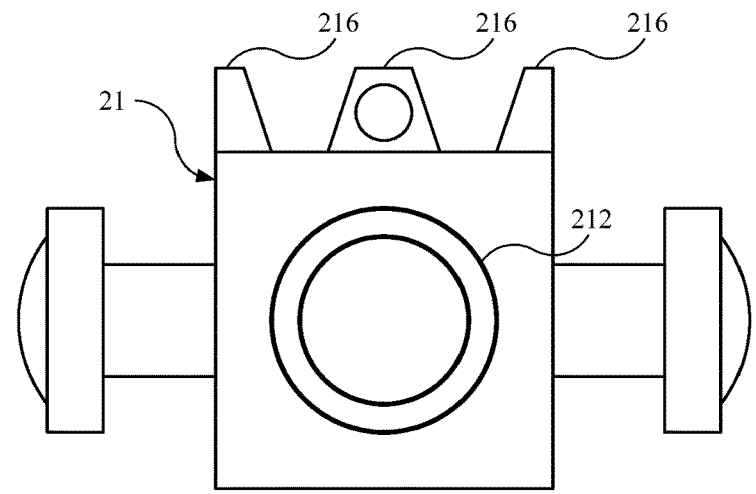
FIG. 3 is a front view drawing of a panoramic fish-eye camera according to another embodiment of the present invention.
Figure 4:
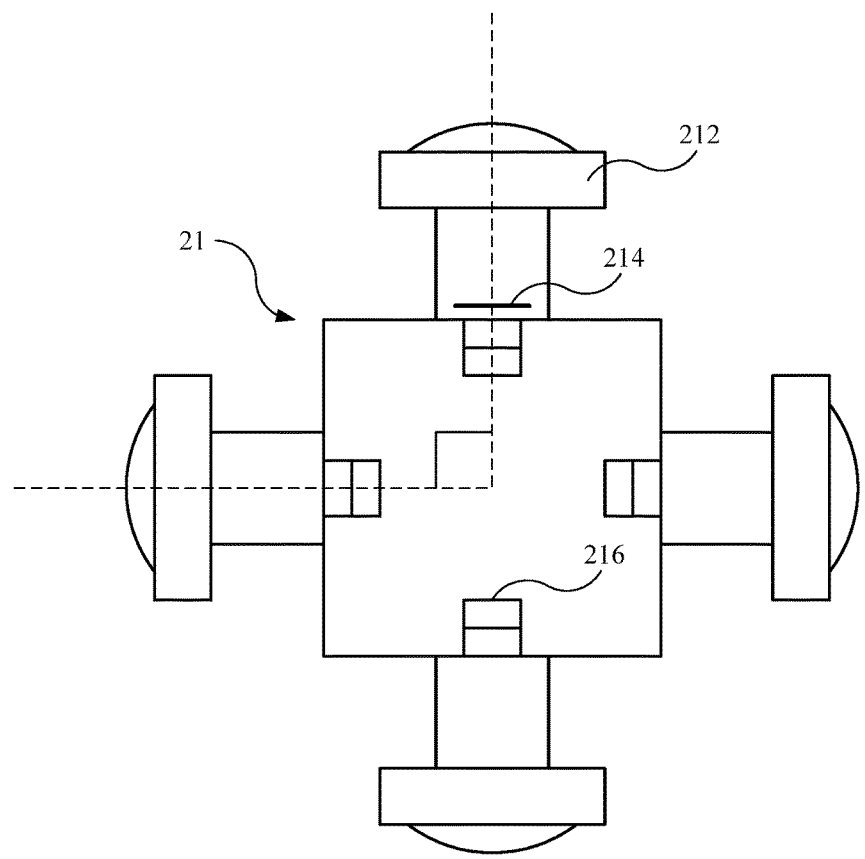
FIG. 4 is a top view drawing of a panoramic fish-eye camera according to another embodiment of the present invention.

Please refer to FIG. 1 to FIG. 4. FIG. 1 and FIG. 2 are method flowcharts according to one embodiment of the present invention. FIG. 3 is a front view drawing of a panoramic fish-eye camera according to another embodiment of the present invention. FIG. 4 is a top view drawing of a panoramic fish-eye camera according to another embodiment of the present invention.

In one embodiment, the present invention provides an image calibrating, stitching and depth rebuilding method 1 of a panoramic fish-eye camera. The method 1 is utilized for calibrating a panoramic image shot by a panoramic fish-eye camera 21 for generating a 3D panoramic image. The panoramic fish-eye camera 21 comprises four fish-eye lens 212, four CMOS sensor modules 214 and four depth calibration modules 216, wherein the number of depth calibration modules 216 is not limited to four and the number of depth calibration modules 216 can be changed according to the demands of people skilled in the art without violating the spirit of the invention. The method 1 comprises the following steps:

(Step S1) establishing a panoramic optical target space, wherein the panoramic optical target space comprises a depth calibration target;

(Step S2) utilizing the panoramic fish-eye camera for shooting the panoramic image of the panoramic optical target space;

(Step S3) establishing a depth calibration parameter between the depth calibration module and the depth calibration target;

(Step S4) establishing an internal calibration parameter of the panoramic fish-eye camera;

(Step S5) establishing an image stitching parameter (external calibration parameter) of the panoramic image and the panoramic optical target space;

(Step S6) establishing a space depth transformation parameter of the panoramic image and the panoramic optical target space; and (Step S7) utilizing the image stitching parameter, the space depth transformation parameter, the internal calibration parameter and the depth calibration parameter to generate a 3D panoramic image, which comprises the panoramic depth information.

Additionally, the execution sequence of step S5 and step S6 is not limited herein; step S5 and step S6 may be executed simultaneously, or step S6 may be executed earlier than step S5.

The details of the aforementioned steps are illustrated as follows. First, the depth of objects cannot be judged easily from the images shot by a monocular vision camera directly. And the actual depth cannot be judged easily because the images shot by the fish-eye lens 212 are deformed. Therefore, in order to establish a relationship between the object depth in 3D space and the 2D planar image, the step S1 is executed first: establishing a panoramic optical target space, several targets marked with the distance of the panoramic fish-eye camera 21 set in a space, and at least one depth calibration target. And then the step S2 is executed to utilize the panoramic fish-eye camera 21 for shooting the panoramic image of the panoramic optical target space to find out the corresponding relationships between the targets in the space and the targets in the panoramic images.

Before finding out the corresponding relationships between the targets in the space and the targets in the panoramic images, the images shot by the fish-eye lens 212 are deformed because of the spherical shapes of the fish-eye lens 212. Therefore, the corresponding relationships of the fish-eye lens 212 and the CMOS sensor modules 214 in the fish-eye camera 21 shall be found out, i.e. the internal calibration parameter shall be found out. As a result, the step S4 is executed in the present invention to establish an internal calibration parameter of the panoramic fish-eye camera. The set locations of the CMOS sensor modules 214 in the panoramic fish-eye camera 21 are marked on the top view drawing of the present invention for the convenience of explanation.

Because the fish-eye lens 212 have semi-spherical shapes substantially and the CMOS sensor modules 214 have planar shapes, the transformation of the spherical coordinate system and the rectangular coordinate system is executed first, to find out the corresponding projection relationships of any point coordinate Xs on the fish-eye lens 212 (the spherical coordinate system) and the image planar coordinate Xd of the CMOS sensor modules 214 (the XY plane of the rectangular coordinate system). After finding out the corresponding projection relationships thereof, the corresponding relationships of the image plane coordinate Xd of the CMOS sensor modules 214 and each pixel allocated on the CMOS sensor modules 214 shall be established by using the following formula.

$$Xp = \begin{bmatrix} u \\ v \end{bmatrix} = \begin{bmatrix} m_u & 0 \\ 0 & m_v \end{bmatrix} \begin{bmatrix} x_d \\ y_d \end{bmatrix} + \begin{bmatrix} u_0 \\ v_0 \end{bmatrix}$$

Wherein Xp is the coordinate of pixels on the CMOS sensor modules 214; mu and mv are the amount of displacement of each pixel generated on the plane; uo and vo are the origin points of the image plane coordinate of the CMOS sensor modules, i.e. the starting points of the coordinate transformation. The step S4 of the present invention is accomplished through the above-mentioned processes by establishing an internal calibration parameter of the panoramic fish-eye camera for transforming any coordinate point Xs of the fish-eye lens 212 to the coordinate Xp of pixels on the CMOS sensor modules 214, and then the internal calibration is executed.

A step S3 can be executed between the step S2 and step S4 to establish a depth calibration parameter between the depth calibration module and the depth calibration target. The depth calibration module 216 comprises one or a combination of distance measuring equipment, comprising a laser rangefinder, an ultrasonic rangefinder and an infrared rangefinder. An actual distance between the panoramic fish-eye camera 21 and the depth calibration target can be acquired by utilizing the depth calibration module 216 for measuring the distance between the depth calibration module 216 and the depth calibration target. But limited to the effective range of the depth calibration module 216, the depth calibration target can only be set within the available effective range of the depth calibration module 216. Wherein the depth calibration module 216 is utilized for detecting the edge of the depth calibration target, and a depth calibration plane can be defined by means of detecting the edge of the depth calibration target. And then the depth calibration parameter composed of the depth calibration plane information and the depth calibration plane distance is established by means of measuring the distance between the depth calibration module 216 and the depth calibration target.

Furthermore, because the depth calibration target is also one of the targets in the panoramic optical target space, an accurate known depth reference data for the after-mentioned space depth transformation parameter is provided by means of overlapping the depth calibration parameter acquired by utilizing the depth calibration module 216 for measuring the depth calibration target and a calibration plane defined by the characteristic points of the depth calibration target while the depth calibration target image is shot by the panoramic fish-eye camera 21. And then the depth distance of all targets in the panoramic target space is acquired by utilizing the depth reference data and a plane equation to compute the actual depth of other targets outside the effective range of the depth calibration module 216. Additionally, the execution sequence of step S2 to step S4 is not limited herein, and the execution sequence of these steps can be decided by users themselves. Even the step S3 can be executed between the step S6 and the step S7.

For establishing the corresponding relationships between the images shot by the individual fish-eye lens and the actual panoramic images to stitch the panoramic picture, the step S5 shall be executed to establish an image stitching parameter (the external calibration parameter) of the panoramic image and the panoramic optical target space. By utilizing the target, like the four checks with black and white alternative of the checkerboard pattern, to establish the relationships between the physical location and the image plane coordinate of the four fish-eye lens by detecting the characteristic point of the target. And then the relationships between the physical body and the space coordinate of the four fish-eye lens 212 from the images shot by the four fish-eye lens 212 are utilized as the image stitching parameter.

As shown in FIG. 3, in one embodiment of the present invention, the panoramic fish-eye camera 21 comprises four fish-eye lens 212. In order to stitch the images shot by the four fish-eye lens 212, the relative positions of the four fish-eye lens 212 shall be corrected. Therefore, the position relationships of the four fish-eye lens 212 are expressed as the following formula in the present invention.

$$x_c = RX + t$$

Wherein X is the image plane (xy plane) of one lens in a position of 3D space; Xc is the intersected position of the image planes between the viewing angles of the other lens and the aforementioned lens in the 3D space; R which is shown as matrix is the rotation rate of the lens optical axis (i.e. about the shooting direction, z axis); t is the required displacement distance of the rotated image plane to correspond with the characteristic points of the intersected planes. In brief, the image plane position of one fish-eye lens is used as the original point, the lens optical axis is used as the z axis, and the image plane is used as the xy plane. And a predetermined coordinate system shall be established to position the optical axis direction of the other fish-eye lens and the image plane position for dealing with the images from the four fish-eye lens more conveniently.

After correcting the relative positions of the four fish-eye lens 212, an image stitching parameter (external calibration parameter) shall be established. Referring to FIG. 3 shown as follows, the intersection angle (shown in dotted lines) of the shooting directions of the neighboring fish-eye lens 212 in the panoramic fish-eye camera 21 is 90 degrees, and the viewing angle of the fish-eye lens 212 is 180 degrees, so at least one overlapping scene of the images shot by the neighboring fish-eye lens 212 respectively is existed. In step S5, the overlapping scene shall be found out from the images shot by the neighboring fish-eye lens 212 respectively. First, one pixel of the images shot by one of the fish-eye lens 212 is appointed. And a characteristic vector is defined according to the color changing around the pixel. Then the corresponding pixels shall be found out in the images shot by the neighboring fish-eye lens 212. After the corresponding relations of at least one characteristic vector and pixel are established, i.e. the image stitching parameter (external calibration parameter) is established, the step S5 is accomplished.

Then the step S6 is executed to establish a space depth transformation parameter of the panoramic image and the panoramic optical target space. After utilizing the panoramic images of the panoramic optical target space shot by the panoramic fish-eye camera 21, the panoramic images of the panoramic optical target space is acquired, and the distance between the target position of the panoramic optical target space and the panoramic fish-eye camera 21 has been known, the step S6 is aimed for establishing a transformation parameter judged by a software system of the corresponding relationships between the target (i.e. the 2D planar image) of the panoramic images and the target (i.e. 3D space) object depth of the panoramic optical target space to acquire a panoramic depth information. Therefore, the distance (i.e. depth) between the panoramic fish-eye camera 21 and the objects of images from the panoramic images shot thereby can be computed by the present invention, the image calibrating, stitching and depth rebuilding method 1 of the panoramic fish-eye camera 21, for calibrating the panoramic 3D images.

In the step S3, the actual depth distance between the depth calibration module and the depth calibration target is acquired by utilizing the depth calibration module 216, and the depth calibration target is some of the targets in the panoramic optical target space, so the depth information (depth calibration parameter) of some targets (i.e. depth calibration target) in all targets of the panoramic optical target space can be acquired by means of the present invention, the image calibrating, stitching and depth rebuilding method 1 of the panoramic fish-eye camera 21. After the step S6 for establishing the space depth transformation parameter is completed, an accurate known depth reference data can be provided for the space depth transformation parameter by utilizing the depth calibration parameter. Therefore, the computing load is decreased and the precision for judging depth can be promoted by utilizing the computer vision parameters, such as the depth calibration parameter, the image stitching parameter and the space depth transformation parameter. When mirrors, glasses or some objects having light absorbing or light reflecting characteristics are existed in the panoramic optical target space or in the actual scene shot by the panoramic fish-eye camera 21, the actual depth of these objects cannot be easily judged by the depth calibration module 216. So the aforementioned computer vision parameters (especially the space depth transformation parameter) shall be utilized to find out the depth of the mirrors, glasses and some objects having light absorbing or light reflecting characteristics. Therefore, the computer vision parameters, such as the depth calibration parameter, the image stitching parameter and the space depth transformation parameter, can be complemented with each other.

By executing the steps S1 to S6, the panoramic images shot by the panoramic fish-eye camera 21, the internal calibration parameter of the panoramic fish-eye camera, the image stitching parameter (i.e. external calibration parameter) and the space depth transformation parameter of the panoramic image and the panoramic optical target space are acquired. Then step S7 is executed for utilizing the image stitching parameter, the space depth transformation parameter, the internal calibration parameter and the depth calibration parameter to generate a 3D panoramic image, which comprises the panoramic depth information.

Furthermore, the aforementioned steps S1 to S6 shall be executed on each of the fish-eye cameras 21 due to the manufacturing difference of the fish-eye cameras 21, so the fish-eye cameras 21 cannot be delivered directly after being produced. A great amount of time and manpower for measurement and calibration will be spent if the fish-eye cameras 21 are mass-produced. Therefore, the present invention of the image calibrating, stitching and depth rebuilding method 1 of the panoramic fish-eye camera 21 further comprises a step S8 for optimizing the parameters. The step S8 comprises a step S81 for collecting the internal calibration parameter, the image stitching parameter, the space depth transformation parameter and the depth calibration parameter from each of the panoramic fish-eye cameras 21; a step S82 for optimizing the internal calibration parameter, the image stitching parameter and the space depth transformation parameter by means of a machine learning, and a step S83 for updating the internal calibration parameter, the image stitching parameter and the space depth transformation parameter.

By continuously collecting the internal calibration parameter for adjusting the relationships between the fish-eye lens 212 and the CMOS sensor modules 214, the image stitching parameter, the space depth transformation parameter and the depth calibration parameter for interpreting the outer environment images and accumulating the parameter data, the depth calibration parameter is compared with other parameters by a machine learning method because the measuring precision of the distance measuring equipment can reach to 1 mm, which allows automatically optimizing each parameter in the panoramic fish-eye camera 21, and updating the parameters by transmitting the optimized parameters to each panoramic fish-eye camera 21, so as to decrease a great amount of time and manpower for measurement and calibration. Wherein the algorithm utilized by the machine learning comprises a Support Vector Machine (SVM).

Figure 5:
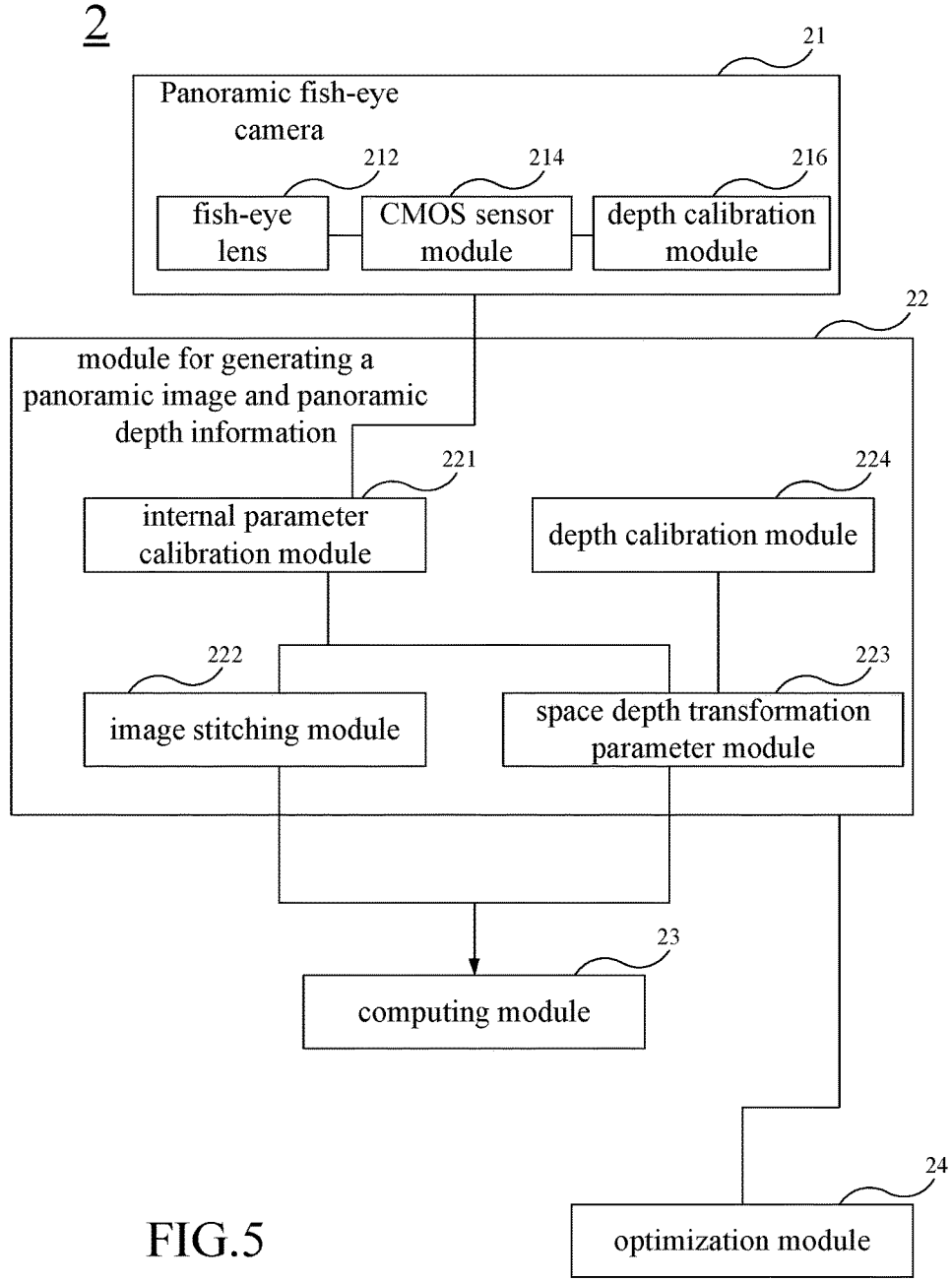
FIG. 5 is a system functional block diagram according to another embodiment of the present invention.

Referring to FIGS. 3 to 5, FIG. 3 is a front view drawing of a panoramic fish-eye camera according to another embodiment of the present invention. FIG. 4 is a top view drawing of a panoramic fish-eye camera according to another embodiment of the present invention. FIG. 5 is a system functional block diagram according to another embodiment of the present invention. Another category of the present invention provides an image calibrating, stitching and depth rebuilding system 2 of a panoramic fish-eye camera, utilized for calibrating a panoramic image to generate a 3D panoramic image which comprises panoramic depth information. The system 2 comprises a panoramic fish-eye camera 21, a module 22 for generating a panoramic image and panoramic depth information, and a computing module 23, wherein the module 22 comprises an internal parameter calibration module 221, an image stitching module 222, a space depth transformation parameter module 223 and a depth calibration module 224.

The panoramic fish-eye camera 21 comprises four fish-eye lens 212, four CMOS sensor modules 214 and four depth calibration modules 216, wherein each one of the fish-eye lens 212 can be attached with a CMOS sensor module 214 and the intersection angle of the shooting directions of the neighboring fish-eye lens 212 is 90 degrees. In addition, the number of depth calibration modules 216 is not limited to four and the number of depth calibration modules 216 can be changed according to the demands of people skilled in the art without violating the spirit of the invention. The module 22 for generating a panoramic image and panoramic depth information is electrically connected with the panoramic fish-eye camera 21. The module 22 comprises an internal parameter calibration module 221, an image stitching module 222, a space depth transformation parameter module 223, and a depth calibration module 224, utilized for generating all the required parameters of the 3D panoramic images to calibrate the panoramic images of the panoramic fish-eye camera 21. The computing module 23 is electrically connected with the module 22 for generating the panoramic image and the panoramic depth information, utilized for calibrating the panoramic images to generate the 3D panoramic image according to the parameters contained by the module 22 for generating the panoramic depth information.

The internal parameter calibration module 221 is utilized for storing the aforementioned internal calibration parameter and executing the coordinate transformation between the fish-eye lens 212 and the CMOS sensor module 214 according to the above-mentioned parameter toward the deformed images due to the shape of the fish-eye lens 212. The image stitching module 222 is utilized for storing the aforementioned image stitching parameter, i.e. external calibration parameter, and stitching the adjusted panoramic images by means of the internal parameter calibration module 221 to generate a panoramic picture. The space depth transformation parameter module 223 is utilized for storing the above-mentioned space depth transformation parameter to find out the corresponding relationships between a 2D planar image and an actual object depth in 3D space shot by the panoramic fish-eye camera 21, to get the panoramic depth information of each pixel in the panoramic images. A depth calibration parameter, stored in the depth calibration module, is utilized as a reference datum for calibrating depth of the space depth transformation parameter.

After the above-mentioned parameters are built up, the computing module 23 is utilized for calibrating and stitching the panoramic picture and the panoramic depth information to generate the 3D panoramic image.

The image calibrating, stitching and depth rebuilding system 2 of a panoramic fish-eye camera of the present invention further comprises an optimization module 24, wherein the optimization module 24 is electrically connected with the module 22 for generating the panoramic image and the panoramic depth information. The optimization module 24 can accumulate a parameter data by means of continuously collecting the internal calibration parameter, the image stitching parameter, the space depth transformation parameter and the depth calibration parameter stored in respective module 22 for generating the panoramic image and the panoramic depth information from each panoramic fish-eye camera 21. And then the depth calibration parameter is compared with other parameters, wherein the parameters of the internal calibration parameter, the image stitching parameter, the space depth transformation parameter and the depth calibration parameter are optimized by means of a machine learning method. After optimizing the parameters, the optimized parameters are utilized for replacing the internal calibration parameter, the image stitching parameter and the space depth transformation parameter to make the 3D panoramic images stitched by the computing module 23 better.

The computing module 23 can be a cloud computing module or stored in a panoramic fish-eye camera, so the panoramic images can be calibrated to generate a 3D panoramic image by utilizing the computing module 23. The internal parameter calibration module 221, the image stitching module 222 and the space depth transformation parameter module 223 are integrated as a single chip or can be a single chip respectively. The algorithm utilized by the machine learning comprises a Support Vector Machine (SVM).

To sum up, an image calibrating, stitching and depth rebuilding method of a panoramic fish-eye camera and a system thereof are provided by the present invention. A panoramic image stitching parameter (external calibration parameter) is computed by means of finding out an internal calibration parameter between the semi-spherical shaped fish-eye lens and the planar CMOS sensor modules of the panoramic fish-eye camera and a panoramic optical target space shot by the panoramic fish-eye camera, and by means of building a space depth transformation parameter between a 2D planar image and an object depth in 3D space at the same time. Finally, the internal calibration parameter, the panoramic image stitching parameter (external calibration parameter) and the space depth transformation parameter are utilized to calibrate a panoramic image shot by the panoramic fish-eye camera for generating a 3D panoramic image.

Compared to the prior art, the panoramic images and depth information can be acquired quickly by the present invention, and the calibration parameters can be optimized by means of accumulating data and a machine learning method. Therefore, the precision can be promoted, so as to simplify the algorithm of 3D depth and to enhance the computing efficiency. Furthermore, the simplified algorithm of 3D depth can be implanted to be executed on a single-chip, so the image calibration system of the fish-eye camera can be calibrated instantly and portable conveniently.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

What is claimed is:

1. An image calibrating, stitching and depth rebuilding method of a panoramic fish-eye camera utilized for calibrating a panoramic image shot by a panoramic fish-eye camera to a 3D panoramic image, wherein the panoramic fish-eye camera comprises four fish-eye lens, four CMOS sensor modules and a depth calibration module, comprising the following steps:

establishing a panoramic optical target space with checkerboard pattern, wherein the panoramic optical target space comprises a depth calibration target;

utilizing the panoramic fish-eye camera for shooting the panoramic image of the panoramic optical target space;

establishing a depth calibration parameter between the depth calibration module and the depth calibration target according to an actual distance between the panoramic fish-eye camera and the depth calibration target, wherein the depth calibration parameter is a reference datum for calibrating depth;

establishing an internal calibration parameter of the panoramic fish-eye camera, wherein the internal calibration parameter is the coordinate transformation parameter between the fish-eye lens and the CMOS sensor modules of the panoramic fish-eye camera;

establishing an image stitching parameter of the panoramic image and the panoramic optical target space, wherein the image stitching parameter is used for a panoramic image stitching parameter by means of computing the relationships between the physical body and the space coordinate of the four fish-eye lens from the images shot by the panoramic fish-eye camera;

establishing a space depth transformation parameter of the panoramic image and the panoramic optical target space base on the panoramic images and the actual distance between the panoramic fish-eye camera and the depth calibration target, wherein the space depth transformation parameter is a transformation parameter between a 2D planar image and an object depth in 3D space; and utilizing the image stitching parameter, the space depth transformation parameter, the internal calibration parameter and the depth calibration parameter to calibrate the panoramic image for generating a 3D panoramic image.

2. The image calibrating, stitching and depth rebuilding method of a panoramic fish-eye camera of claim 1, further comprising the following step: optimizing the parameters.

3. The image calibrating, stitching and depth rebuilding method of a panoramic fish-eye camera of claim 2, wherein the step of optimizing the parameters comprises the following step: collecting the internal calibration parameter, the image stitching parameter, the space depth transformation parameter and the depth calibration parameter from each of the panoramic fish-eye cameras.

4. The image calibrating, stitching and depth rebuilding method of a panoramic fish-eye camera of claim 3, wherein the step of optimizing the parameters comprises the following step: comparing and optimizing the depth calibration parameter to the internal calibration parameter, the image stitching parameter and the space depth transformation parameter by means of a machine learning, wherein the algorithm utilized by the machine learning comprises a Support Vector Machine.

5. The image calibrating, stitching and depth rebuilding method of a panoramic fish-eye camera of claim 4, wherein the step of optimizing the parameters comprises the following step: updating the internal calibration parameter.

* * * * *